March 15, 1949.   J. B. DAVENPORT ET AL   2,464,559
CAMERA DIAPHRAGM ADJUSTING MECHANISM
Filed March 31, 1945   4 Sheets-Sheet 1

INVENTORS
GEOFFREY GILBERT
JOHN DAVENPORT
BY
Blair, Curtis & Hayward
ATTORNEYS

March 15, 1949.   J. B. DAVENPORT ET AL   2,464,559
CAMERA DIAPHRAGM ADJUSTING MECHANISM Filed March 31, 1945   4 Sheets-Sheet 3

INVENTORS
GEOFFREY GILBERT
JOHN DAVENPORT
BY
Blair, Curtis + Hayward
ATTORNEYS

March 15, 1949.  J. B. DAVENPORT ET AL  2,464,559
CAMERA DIAPHRAGM ADJUSTING MECHANISM
Filed March 31, 1945  4 Sheets-Sheet 4

INVENTORS
GEOFFREY GILBERT
JOHN DAVENPORT
BY
Blair, Curtis & Hayward
ATTORNEYS

Patented Mar. 15, 1949

2,464,559

UNITED STATES PATENT OFFICE 2,464,559

CAMERA DIAPHRAGM ADJUSTING MECHANISM

John B. Davenport and Geoffrey Gilbert, New York, N. Y.

Application March 31, 1945, Serial No. 585,978

12 Claims. (Cl. 95—64)

This invention relates to photographic apparatus and more particularly to a method and apparatus for automatically maintaining a predetermined relation between the position of the lens, a control means for controlling the quantity of light which passes through the lens, and the sensitized surface of a camera or other photographic apparatus.

The present invention is particularly well adapted for use in flash photography, although as will be apparent to those skilled in the art, it may also be usefully employed with other types of photographic apparatus using a fixed source of illumination such as photographic enlargers, photostat machines and the like. In flash photography it is a common practice to mount a source of illumination such as a flash bulb in fixed relation to a camera, the flash bulb or other source of light being selected to give a desired and predetermined intensity of illumination in front of the camera. For a light source of any given candle power mounted on the camera the intensity of illumination of the object to be photographed varies inversely as the square of the object distance, that is, the distance between the lens of the camera and the object to be photographed. Hence in order to obtain a constant predetermined image intensity on a film or other sensitized surface within the camera for different object distances, the quantity of light which passes through the lens must be regulated. Such regulation may be effected either by varying the aperture of the diaphragm of well-known construction which is incorporated in most cameras or by varying the time of exposure of the sensitized surface.

The desired relationship between object distance and lens aperture to produce constant image intensity may be approximately represented by the following equation:

$$F = fD_0C$$

wherein:

$C$ = a constant for a particular light source, film speed and shutter speed,
$D_0$ = the object distance,
$f$ = the ratio of the focal length of the lens to the diameter of the lens aperture, sometimes called the focal number of the lens, and
$F$ = the flash factor.

The flash factor $F$ is a constant for a source of illumination of given candle power and a given film and exposure but varies for light sources of different power, film of different sensitivities, and for different intervals of exposure.

The above equation states that the product of focal number and object distance is a constant and suggests that as the object distance is decreased, the focal number of the lens should be increased proportionately in order to maintain constant image intensity on the film. As previously stated, this relationship is only an approximate one. For relatively large object distances, i. e. object distances in excess of perhaps 60 times the focal length of the lens, the maintenance of strict inverse proportionality as expressed in the above equation will produce a substantially constant image intensity on the film but for shorter object distances the product of local number and object distance must be decreased in order to maintain a constant image intensity. The reason for this is that as the camera is moved closer to the object to be photographed, and the lens focused for the shorter object distance, the light passing through the lens is spread over a greater area of film, and hence, in order to obtain constant intensity of illumination on the film, the lens aperture must be made somewhat larger than it would be in accordance with the above equation. In other words, in order to get constant image intensity for the shorter object distances, the focal number of the lens should be so adjusted that the product of focal number and object distance decreases somewhat as the object distance becomes relatively small. This departure from strict inverse proportionality may be treated as a function of object distance and is so treated herein.

The problem of maintaining the correct relationship between focal number and focal position of the lens is complicated by the fact that both the relationship between lens position and object distance and the relationship between aperture area and the position of the aperture adjusting member are nonlinear. Various mechanisms have been suggested heretofore for automatically maintaining the desired relationship between lens aperture and the focal position of the lens, but so far as we are aware, none of these mechanisms has been wholly satisfactory. Some of these mechanisms have been accurate throughout a part of the range of adjustment of the lens and inaccurate at other parts of the range. Others have been incapable of adjustment for different flash factors. Still others have been accurate for one value of flash factor but inaccurate at other values of flash factors.

We have discovered that by using mechanism capable of mechanically converting equi-multiple changes into corresponding equal movements of a movable member, it is possible to obtain both flash factor adjustability and maintenance of the desired accurate relationship between lens aperture and lens position. The term "equi-multiple changes" as used herein, connotes changes of the type which occur between the terms of a geometric progression. As an example, changes in aperture area of 1 to 1.5, 3 to 4.5, and 6 to 9 are equi-multiple changes. Such changes are sometimes referred to as equal percentage changes.

In accordance with a preferred embodiment of the method of the present invention, equi-multiple changes in aperture area are mechanically converted to equal movements of a first movable member; lens movements corresponding with changes in object distance which for a given aperture produce equi-multiple changes in image intensity are mechanically converted into equal movements of a second movable member; and the two movable members are so interconnected that the relationship between them may be selectively adjusted for different flash factors. We have found that by using this method the mechanism interconnecting lens aperture and lens may be adjusted for different flash factors and will give the desired relation between lens aperture and focal position of the lens for all values of flash factor for which the mechanism is adjustable.

It is an object of the present invention to provide apparatus for automatically adjusting the lens aperture or other light controlling means of a camera or other photographic apparatus to a value which will produce a predetermined constant image intensity on the sensitized surface of the camera as the lens of the camera is focused for a desired object distance. It is a further object of the present invention to provide apparatus of this type which may be adjusted for different flash factors, i. e. light sources of different intensities, different film sensitivities, and different intervals of exposure. It is another object of the invention to provide apparatus of this type which will accurately maintain the desired relationship between lens aperture and the focal position of the lens for a plurality of different flash factors. Other objects will be in part obvious and in part disclosed hereinafter.

The many objects and advantages of the present invention may best be understood and appreciated by reference to the accompanying drawings which illustrate specific embodiments of the invention and wherein.

Referring now to Figures 1-4, there is shown a lens mount of the usual type including a focusing ring 1 which is rotatable to vary the distance between the lens, and the sensitized surface of the camera. The focusing ring 1 carries an object distance scale 2 which cooperates with a stationary reference mark 3 to indicate the object distance for which the camera is focused.

Figure 1:
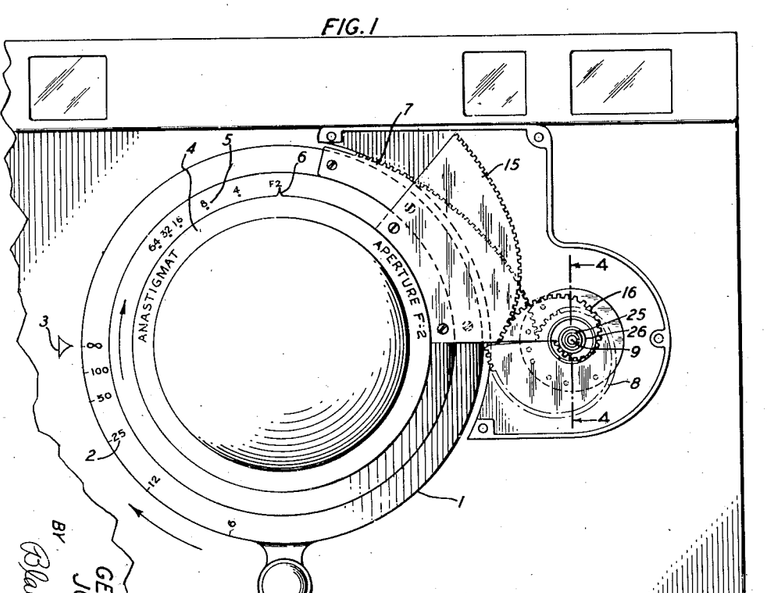
Figure 1 is a front elevation of the lens mount of a camera of the ring focusing type with apparatus constructed in accordance with the present invention mounted in operative relation thereto.

The lens aperture is varied by means of a rotatable ring 4, carrying an f-scale 5 which cooperates with a stationary reference mark 6 to indicate effectively the degree of opening of the lesn aperture. The apparatus about to be described maintains the ring 4 in such relationship to the ring 1 that as the lens is focused, as for example by rotation of ring 1, the aperture is adjusted to that value which will give at the sensitized surface a predetermined image intensity which is the same for all values of object distance.

Figure 2:
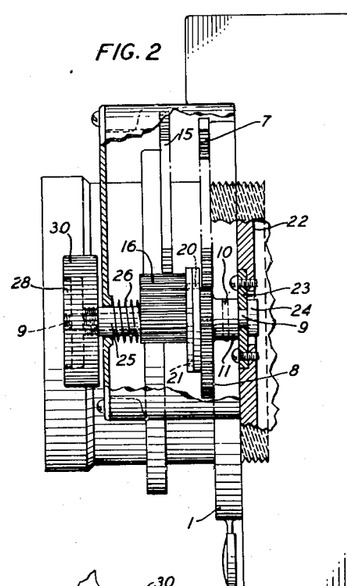
Figure 2 is a side elevation partly in section of the structure shown in Figure 1.
Figure 3:
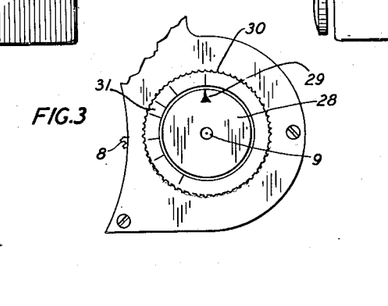
Figure 3 is a front view of the adjusting knob and flash factor reference scale of the apparatus of Figure 1.
Figure 4:
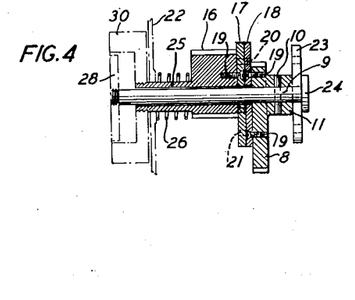
Figure 4 is an axial section taken on the line 4—4 of Figure 1.

Mounted on the ring 1 there is an eccentric gear segment 7 which meshes with another eccentric gear 8 mounted on a shaft 9. As shown in Figures 2 and 4, gear 8 is fixed to the shaft 9 by a key 10 which extends through a hub 11 of the gear.

Mounted on the aperture ring 4 there is an eccentric gear segment 15 which meshes with a gear 16 mounted on the shaft 9 but freely rotatable with respect thereto. A driving engagement between gear 8 and gear 16 is provided through the medium of a pair of discs 17 and 18 which are connected to the gears 16 and 8 respectively in any suitable manner such as by the screws 19 (see Figure 4). Disc 18 is provided with a pin 20 which fits into one of a series of corresponding holes 21 in the disc 17 thus providing a driving connection between the gears 8 and 16.

The eccentric gears are enclosed in a casing 22 which also serves to support the gears and the shaft 9. Referring to Figure 2, the shaft 9 at its right-hand end is supported by a plate 23 which is fixed to the casing 22. A flanged portion 24 of the shaft 9 bears against one side of plate 23 and the hub 11 of gear 8 bears against the other side of plate 23 in such manner as to prevent lateral movement of the shaft 9.

Further support for the shaft 9 is provided by the hub 25 of gear 16 in that the hub extends through casing 22 and is supported thereby. Surrounding hub 25 there is a helical spring 26 which at its right-hand end bears against gear 16 and at its left-hand end bears against casing 22 in such manner that gear 16 is continuously urged to the right as shown in Figures 2 and 4. Spring 26 serves to maintain the pin 20 of disc 18 in engagement with one of the holes 21 of disc 17.

Means are provided for adjusting the relationship between the gear 16 and the gear 8 and consequently the relationship between the focusing ring 1 and the aperture ring 4. At its left end shaft 9 is provided with a disc 28 which carries (see Figure 3) a stationary reference mark 29. Fixed to the hub 25 of gear 16 and partially embracing disc 28 is a cup-shaped knob 30 which carries a suitable scale for indicating the relationship between gears 8 and 16. To change this relationship, the knob is drawn to the left as shown in Figure 4 against the force of spring 26 to an extent sufficient to disengage pin 20 from holes 21 and the knob is then rotated until reference mark 29 indicates the desired flash factor on scale 31, after which the knob is released to permit reengagement of pin 20 of disc 18 and holes 21 in disc 17. In this way the relationship between the aperture and the extension of the lens may be adjusted for different desired flash factors.

CONSTRUCTION OF GEARS

As pointed out above, the gears 15 and 16 are so shaped that equi-angular movements of the shaft 9 produce equi-multiple changes in the degree of opening of the aperture. Similarly, gears 7 and 8 are so shaped that as the lens is focused by movement of focusing ring 1, changes in lens position that correspond with equi-multiple changes in image intensity produce equi-angular movements of the shaft. One method of arriving at the proper shape of gears is described below. In this description, the lens is assumed to be of a type suitable for use in a miniature camera and is assumed to have a focal length of three inches.

A method of determining the shape of gears 7 and 8 is outlined in Table I below:

*Table I*

| Step No. | Image Intensity | Object Distance | Angular position of Gear 7 | Angular movement of Gear 7 | Angular movement of Gear 8 | Ratio of Radii |
|---|---|---|---|---|---|---|
| | | | Degrees | Degrees | Degrees | |
| 1 | 1.0 | 4.8 | 100 | | | |
| | | | | 32.5 | 45 | .72 |
| 2 | .5 | 6.9 | 67.5 | | | |
| | | | | 19.0 | 45 | .42 |
| 3 | .25 | 9.7 | 48.5 | | | |
| | | | | 15.5 | 45 | .34 |
| 4 | .125 | 13.9 | 33.0 | | | |
| | | | | 10.0 | 45 | .22 |
| 5 | .0625 | 19.9 | 23 | | | |
| | | | | 7.0 | 45 | .15 |
| 6 | .03125 | 28.2 | 16 | | | |
| | | | | 4.5 | 45 | .10 |
| 7 | .015625 | 39.9 | 11.5 | | | |

The method outlined in Table I comprises generally selecting arbitrarily a set of image intensities which are related to each other as the terms of a geometric progression and computing the ratio of radii of gears 7 and 8 that will cause equi-angular movement of gear 8 with equi-multiple changes in image intensity. Unit image intensity is assumed to be the intensity of illumination on the sensitized surface when the lens is focused on an object 4.8 feet from the lens with a light source of predetermined and fixed intensity at the camera and a predetermined and fixed aperture setting.

In Table I a progression of seven steps is used and the values of image intensity given in the second column are so related that each value is one-half the next preceding value. The corresponding values of object distance (assuming constant aperture) are given in the third column. By definition the object distance for unit intensity is 4.8 feet. The other values of object distance in the third column may be obtained by use of the following well-known equation:

$$\frac{I_1}{I_2} = \frac{D_2^2}{D_1^2} \times \frac{Q_2^2}{Q_1^2}$$

wherein:

$I_1$ and $I_2$ are values of image intensity $D_1$ and $D_2$ are object distances corresponding to the intensities $I_1$ and $I_2$, and $Q_1$ and $Q_2$ are lens to film distances when the lens is focused for the distances $D_1$ and $D_2$.

Values for $Q_1$ and $Q_2$ may be obtained from the equation:

$$Q = \frac{Df}{D-f}$$

wherein:

$D$=the object distance, and $f$=the focal length of the lens in feet (in this case .25).

The fourth column gives the angular position of the focusing ring and consequently of the gear 7 that corresponds with object distances in the third column. These angular positions may be obtained from the equation:

$$a = \frac{Q-f}{l} \times 360°$$

wherein:

$a$=the angular position of the gear 7, $Q$=the lens to film distance, $f$=the focal length of the lens, and $l$=the lead of the screw used in focusing the lens.

The fifth column of Table I gives the angular movement of gear 7 per step and is obtained by subtracting adjacent values in column four. An arbitrarily selected set of equi-angular movements of gear 8 is given in the sixth column and values for the ratio of radii in column seven are obtained by dividing the values of column five by corresponding values in column six. It is evident that when the ratio of radii capable of producing the desired relative motion of the gears are known, it is possible to construct gears having the proper curvature.

Table I is intended merely to indicate a method that may be used. The accuracy of the method depends upon the number of steps used and we have found that it is desirable to use a substantially larger number of steps than were used in preparing the table. In general we have found that it is desirable to use a progression of at least about 300 steps in order to secure desired accuracy.

The shape of gears 15 and 16 may be determined in a similar fashion and the method is outlined in Table II below:

*Table II*

| Aperture Area | Aperture Radius | Angular position of Gear 15 | Angular movement of Gear 15 | Angular movement of Gear 16 | Ratio of Radii |
|---|---|---|---|---|---|
| | | Degrees | Degrees | Degrees | |
| 1.216 | .624 | 0 | | | |
| | | | 28.5 | 45 | .63 |
| .608 | .441 | 28.5 | | | |
| | | | 18.2 | 45 | .40 |
| .304 | .312 | 46.7 | | | |
| | | | 15.3 | 45 | .34 |
| .152 | .221 | 62 | | | |
| | | | 11.2 | 45 | .25 |
| .076 | .156 | 73.2 | | | |
| | | | 6.4 | 45 | .14 |
| .038 | .110 | 79.6 | | | |
| | | | 4.4 | 45 | .10 |
| .019 | .078 | 84 | | | |

In Table II the first column is a series of values for aperture area in square inches so chosen that each value is half the next preceding value. Corresponding values of aperture radius are given in the second column.

The values for angular position of the aperture ring and gear 15 may be obtained empirically by measuring the aperture radius and noting the corresponding positions of the aperture ring. The relation between aperture radius and the angular position of the aperture ring is approximately a linear one. If a high degree of accuracy is required, measured values of aperture radius may be plotted against corresponding ring positions to give a curve and then aperture ring positions may be read from the curve for any desired value of aperture radius.

The ratio of radii in column six are obtained in the same way as described above for gears 7 and 8. As in the case of gears 7 and 8, it is desirable that a progression of at least about 300 steps be used to obtain desired accuracy.

It is of course to be understood that the above method is illustrative only and that various other methods including methods involving the use of the calculus may be employed in arriving at the proper shape of the gears.

BELLOWS FOCUSING CAMERA

Figure 5:
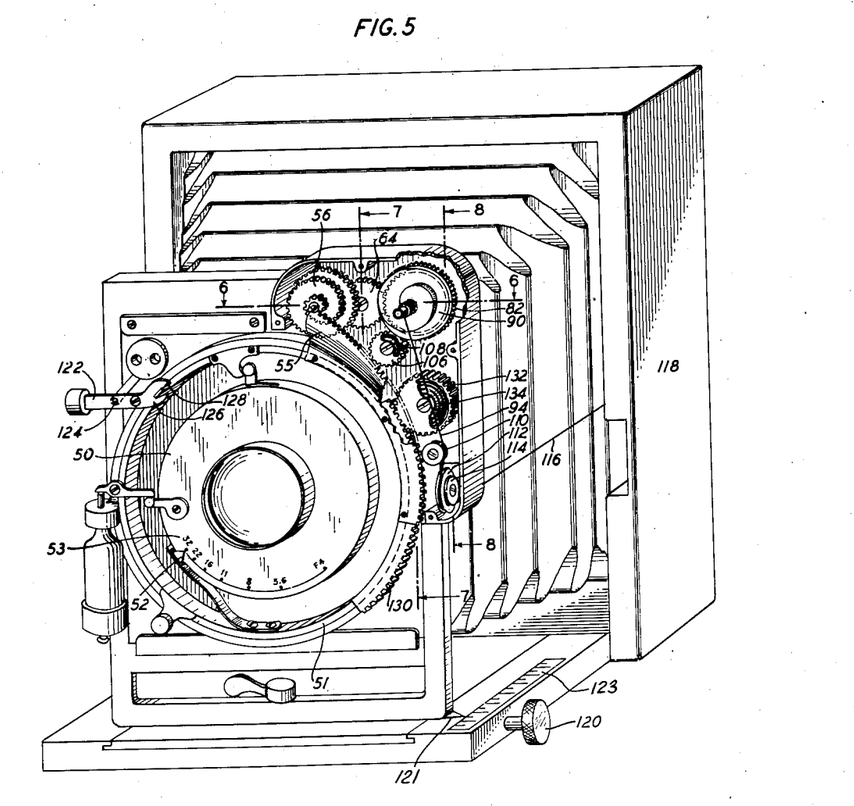
Figure 5 is a perspective view of a bellows focusing camera with apparatus constructed in accordance with the present invention mounted in operative relation thereto.

Figures 5 to 10 show the construction of a bellows focusing camera embodying the present invention. Referring to Figure 5, a lens mount 50 is shown having an aperture ring 51 which is operatively connected to the lens aperture or diaphragm and carries an indicating arm 52 in the form of a leaf spring that cooperates with a scale 53 to indicate the degree of opening of the lens aperture or diaphragm. The ring 51 is urged in a counter-clockwise direction in the following manner: A gear segment 130 fixed to the ring 51 meshes with a gear 132 having an internal coil spring 134. The spring is fixed at one end and so connected to the gear 132 at its other end as to tend to rotate the gear in a clockwise direction and hence tends to urge ring 51 in a counter-clockwise direction. The ring 51 is initially rotated to its extreme clockwise position, i. e. with the diaphragm completely closed, and is held in this position by a detent 126 which is located at the end of a lever 122 and which engages a projection 128 on the ring. When the lens has been focused, the lever 122 is rotated about its pivot 124 to cause detent 126 to disengage projection 128, and the ring 51 is moved by spring 134 in a counter-clockwise direction to open the diaphragm to the desired extent. The extent to which the diaphragm opens is controlled by the mechanism described below. In addition to gear segment 130 the ring 51 carries a gear segment 55 which meshes with a spiral gear 56, the shape of gears 55 and 56 being such that equi-multiple changes in aperture correspond with equi-angular movements of the spiral gear 56. The shape of gears 55 and 56 may be determined by the method described above.

Figures 6, 7, 8, 9, 10:
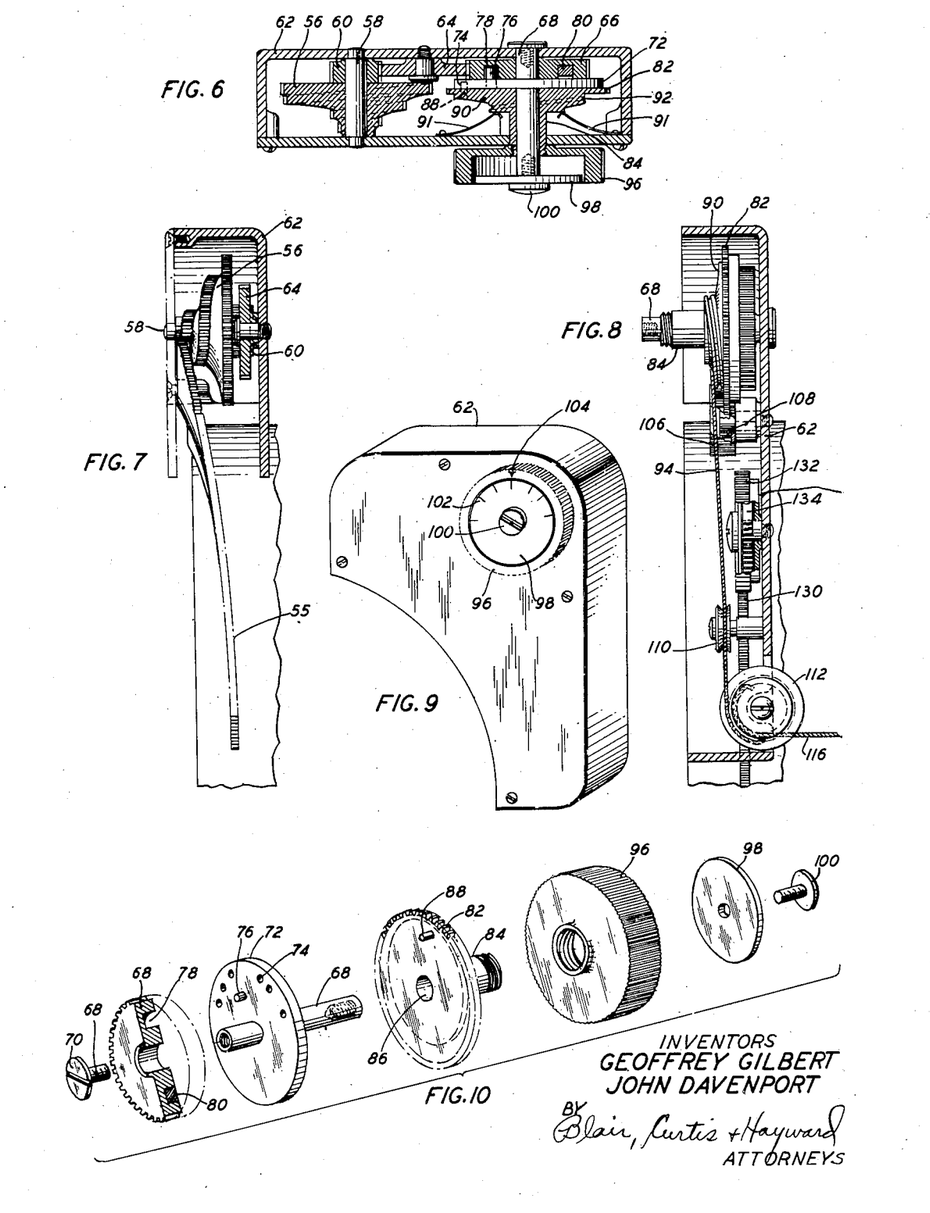
Figure 6 is a horizontal section taken on the line 6—6 of Figure 5.
Figure 7 is a side elevation, partly in section, taken on the line 7—7 of Figure 5 and showing the aperture ring gear segment and spiral gear construction.
Figure 8 is a side elevation, partly in section, taken along the line 8—8 of Figure 5 and showing the wind-up drum and associated parts.
Figure 9 is a front perspective view of the gear casing showing the adjusting knob and flash factor reference scale of the apparatus of Figure 5.
Figure 10 is an expanded perspective view of the wind-up drum shaft and the various members carried thereon.

Referring now to Figures 6 and 7, the spiral gear 56 is mounted on a shaft 58 which also carries a spur gear 60 fixed to the shaft. As shown in Figures 6 and 7 the shaft is rotatably supported in a gear casing 62. The spur gear 60 through an idler gear 64 drives a second spur gear 66 which is mounted on and rotatable with respect to a shaft 68.

The shaft 68, like shaft 58, is rotatably supported by the casing 62 and carries a number of gear and disc elements best shown in Figure 10 in expanded perspective. At the left of Figure 10 there is shown a screw 68 having a head 70. When the shaft and associated parts are assembled (see Figures 6 and 7) the head 70 forms a flange which bears against the wall of casing 62 and tends to prevent axial movement of the shaft. Fixed to the shaft there is a disc 72 having a plurality of holes 74 near its outer periphery. On the left-hand face of the disc there is a pin 76 which, when the parts are assembled, fits into a circular channel 78 formed in the gear 68. A stop 80 at one point in channel 78 limits relative rotation of disc 72 and gear 68 to approximately one revolution.

To the right of disc 72 in Figure 10 there is shown a gear 82 having a hub or sleeve 84 with an internal bore 86 of such size as to permit the shaft 68 to slide therethrough. The left face of gear 82 is provided with a pin or projection 88 which is so located as to fit into one of the holes 74 and thus provide a driving connection between gear 82 and disc 72.

Referring again to Figures 6 and 8, the gear 82 has fixed thereto a wind-up drum 90 having a spiral groove or channel 92 formed therein, which receives a cord 94 in such manner that rotation of the gear 82 causes the cord to wind up or unwind on the drum 90 an amount which is a variable function of the angular movement of the gear. The shape of the spiral groove is such that equi-angular movements of the gear 82 produce linear movements of the cord 94 which are proportional to lens movements corresponding with equi-multiple changes in image intensity at constant aperture.

To maintain a driving connection between gear 82 and disc 72 a plurality of springs 91 are provided. The springs 91 are fixed to the casing 62 and bear against drum 90 in such manner as to prevent pin 88 from slipping out of holes 74.

The end of hub 84 extends through the wall of casing 62 and is threaded to receive a cup-shaped knurled knob 96. Within the cup of knob 96 and bearing against the end of shaft 68 there is a disc 98 which is held in place by a screw 100 threaded into the end of the shaft. As shown in Figure 9 the disc 98 has a scale 102 which cooperates with a reference mark 104 on knob 96 to indicate the flash factor for which the device is set. To change the flash factor setting knurled knob 96 is drawn forwardly (as shown in Figure 9) to compress springs 91 and disengage pin 88 from one of holes 74 in disc 72. The knob is then rotated until reference mark 104 is opposite the desired point on scale 102 and the knob is released to permit pin 88 to reengage disc 72. The holes 74 correspond with divisions on scale 102.

Referring now to Figures 5 and 8, the gear 82 meshes with a gear 106 mounted on the casing 62 and having an internal coil spring 108. The spring 108 is so connected to gear 106 as to tend to rotate the gear in a counter-clockwise direction (Figure 5) and hence gear 82 and drum 90 are continuously urged in a clockwise direction to maintain the cord 94 in tension. The cord 94 extends downwardly from groove 92 over an idler pulley 110 to a wind-up pulley 112, one end of cord 94 being fixed to the pulley 112 and the other end to the spiral groove 92 at its point of greatest diameter.

Fixed to the pulley 112 there is a second and, in this case, smaller wind-up pulley 114 which carries a second cord 116 fixed at one end to the pulley 114 and at its other end to the casing 118 of the camera. The pulleys 112 and 114 are preferably made easily demountable so that they may be replaced by pulleys of different sizes to vary the relationship between movement of cord 94 and movement of cord 116.

The operation of the above-described mechanism is as follows: The camera is focused by adjustment of the knurled knob 120 to the proper focus for the object to be photographed. A reference mark 121 fixed to the lens mount 50 cooperates with a conventional object distance scale 123 to indicate the object distance for which the lens is focused. During the focusing operation the lens mount 50 will move relative to the casing 118 and thus pulleys 112 and 114 will be rotated. As the lens mount is moved closer to the sensitized surface, for example, pulleys 112 and 114 will be rotated (Figure 8) in a clockwise direction to cause cord 94 to unwind an amount which is proportional to the movement of the lens mount. As cord 94 unwinds from pulley 112, spring 108 causes drum 90 to rotate to wind-up cord 94 in spiral groove 92. The angular movement of drum 90 is a nonlinear function of the linear movement of cord 94 and its character has been previously described. The effect of rotation of drum 90 is to locate pin 76 in a position which, for any particular flash factor, bears a definite relation to the position of lens mount 50.

After the camera has been focused, the shutter is cocked in the usual way by rotating lever 122 (Figure 5) about pivot 124 to cause detent 126 to disengage projection 128 on ring 51. Spring 134 will then cause ring 51 to move in a counterclockwise direction to open the diaphragm and through spiral gear 58, and gears 60 and 64 will move gear 66 in a clockwise direction until the stop 80 comes into its operative position in contact with pin 76. Since the pin 76 has previously been positioned in accordance with the focal position of the lens, there will be a definite relationship between lens position and aperture. This relationship is such that the image intensity on the film is the same irrespective of the distance between the lens and the object to be photographed.

TANGENTIAL LINKAGE

Figure 11:
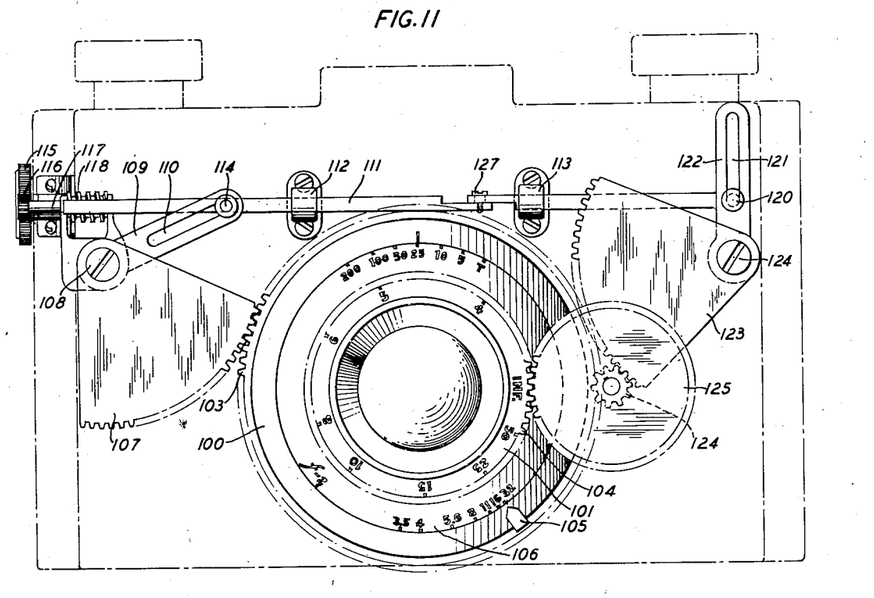
Figure 11 is a front view of a third embodiment of the present invention wherein a tangential linkage is used.
Figure 12:
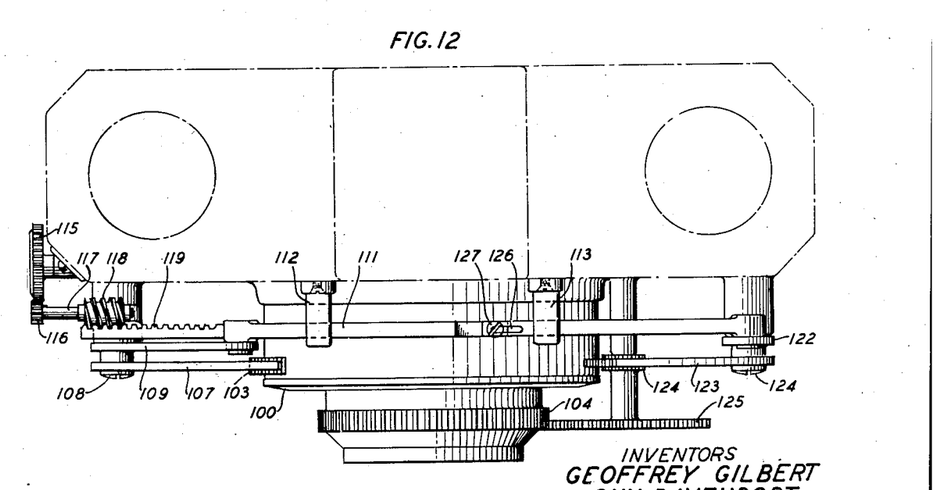
Figure 12 is a top view of the structure of Figure 11.

In Figures 11 and 12 there is shown another embodiment of the present invention wherein the desired conversion of equi-multiple changes into equal movements of a movable member is attained by the use of an adjustable tangential linkage. The structure of Figures 11 and 12 makes use of geometric progression such as 38.8°, 19.4°, 9.7°, 4.85° . . . This type of progression, as indicated in Table III, is characterized by the fact that the tangents of the sums of its terms form an approximate arithmetic progression.

*Table III*

| Angle | Sum | Tan (Sum) | |
|---|---|---|---|
| Degrees | Degrees | | |
| 38.8 | 38.8 | .804 | 1×tan 38.8°=.804 |
| 19.4 | 58.2 | 1.613 | 2×tan 38.8°=1.608 |
| 9.7 | 67.9 | 2.463 | 3×tan 38.8°=2.412 |
| 4.85 | 72.75 | 3.221 | 4×tan 38.8°=3.216 |

Referring now to Figure 11 of the drawings, a ring focusing camera similar to that of Figure 1 is shown having an aperture ring 100 and focusing ring 101 provided with the peripheral gear segments 103 and 104 respectively. Aperture ring 100 carries a reference mark 105 that cooperates with a stationary reference scale 106 to indicate the amount of opening of the aperture. Meshing with the gear segment 103 there is a gear segment 107 rotatably mounted on a shaft 108 in such manner that rotation of segment 107 rotates ring 100 to vary the lens aperture. A lever 109 having a slot 110 is fixed to the segment 107 to rotate therewith.

The lever 109 and segment 107 are rotated by means of the tangential link 111 which is slidably mounted in the supports 112 and 113 and is provided with a pin 114 that engages and is slidable in the slot 110. Movement of the link 111 is effected (see Figure 12) by means of an adjusting gear 115. The adjusting gear 115 through a spur gear 116 and shaft 117 turns a worm gear 118 that cooperatives with a rack 119 fixed to the link 111. Thus gear 115 may be manually rotated to move link 111 longitudinally and thereby rotate lever 109 and segment 107.

The function of the structure thus far described is to cause equal movements of the link 111 to produce equi-multiple changes in the lens aperture. The position of lever 109 with respect to segment 107 is such that the lever is in a vertical position when reference mark 105 is opposite f2 on the scale 106. The radius of the gear segment 107 is so chosen in relation to the radius of the aperture ring that as the aperture ring moves from f2 to f4 the segment 107 moves through an angle of 38.08°, as the ring moves from f4 to f8 the segment moves 19.4°, and so on to f32. The linear movement of pin 114 and link 111 is proportional to the tangent of the angle through which the segment 107 turns and therefore from a consideration of Table III above, it is apparent that equal movements of the link 111 will produce equi-multiple changes in the lens aperture diameter and also in the aperture area.

The link 111 is connected to the focusing ring 101 in a manner similar to that described above. At its right-hand end the link is provided with a pin 120 that slidably engages a slot 121 in lever 122. The lever is fixed to a gear segment 123 that is rotatably mounted on shaft 124. The segment 123 through the reducing gears 124 and 125 rotates the focusing ring 101 to focus the lens of the camera. The construction is such that equal movements of the link 111 produce equi-multiple changes in the position of the lens. The length of link 111 may be adjusted by means of a slot 126 and screw 127 to adjust the device for different flash factors.

The operation of the mechanism is evident from the above description. The camera is focused by rotation of the adjusting gear 115 and as the lens is adjusted the mechanism described makes a compensating change in the lens aperture. If the object distance decreases, for example, the aperture is automatically closed to such an extent that the quantity of light passing through the lens during a given interval of exposure is approximately the same as for the original object distance.

From the above description it is apparent that the present invention provides apparatus for coadjusting the focal position of the lens and the setting of a light controlling means of a camera or other photographic apparatus to achieve the several objects set forth at the beginning of this specification. Since various embodiments might be made of this invention, and since various changes might be made in the construction herein described, all without departing from the scope of the invention, it is to be understood that all

We claim:

1. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined desired relationship with respect to the focal position of the lens and the sensitized surface of said photographic apparatus comprising, in combination, a diaphragm for varying said lens aperture, rotatable diaphragm adjusting means so connected to said diaphragm that angular movement of said adjusting means is substantially proportional to the square of the diameter of said aperture, focusing means mechanically connected to said lens for moving said lens to a focal position corresponding with the distance between the lens and the object to be photographed, indicating means associated with said focusing means for indicating the object distance for which said lens is focused, a movable member, first interconnecting means operative to interconnect said diaphragm adjusting means and said movable member to produce equi-multiple changes in the area of said lens aperture with equal changes in the operative position of said movable member and second interconnecting means for interconnecting said focusing means and said movable member to produce corresponding movement of said lens and said movable member, said interconnecting means so interconnecting said movable member and said focusing means that when the object distance is that distance indicated by said indicating means equal changes in the operative position of said movable member correspond, at constant aperture area, with equi-multiple changes in the image intensity on said sensitized surface, whereby when said first interconnecting means operatively connects said diaphragm adjusting means and said movable member, said predetermined desired relationship is established between said aperture and the focal position of said lens.

2. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined desired relationship with respect to the focal position of the lens and the sensitized surface of said photographic apparatus comprising, in combination, a diaphragm for varying said lens aperture, rotatable diaphragm adjusting means so connected to said diaphragm that angular movement of said adjusting means is substantially proportional to the square of the diameter of said aperture, focusing means mechanically connected to said lens for moving said lens to a focal position corresponding with the distance between said lens and the object to be photographed, indicating means associated with said focusing means for indicating the object distance for which said lens is focused, a rotatable member, first interconnecting means operative to interconnect said diaphragm adjusting means and said rotatable member to produce equi-multiple changes in the area of said lens aperture with equi-angular changes in the operative position of said rotatable member and second interconnecting means for interconnecting said focusing means and said rotatable member to produce corresponding movement of said lens and said rotatable member, said interconnecting means so interconnecting said rotatable member and said focusing means that when the object distance is that distance indicated by said indicating means equi-angular changes in the operative position of said rotatable member correspond, at constant aperture area, with equi-multiple changes in the image intensity on said sensitized surface, whereby when said first interconnecting means operatively connects said diaphragm adjusting means and said rotatable member, said predetermined desired relationship is established between said aperture and the focal position of said lens.

3. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined desired relationship with respect to the focal position of the lens and the sensitized surface of said photographic apparatus comprising, in combination, a diaphragm for varying said lens aperture, rotatable diaphragm adjusting means so connected to said diaphragm that angular movement of said adjusting means is substantially proportional to the square of the diameter of said aperture, focusing means mechanically connected to said lens for moving said lens to a focal position corresponding with the distance between the lens and the object to be photographed, indicated means associated with said focusing means for indicating the object distance for which said lens is focused, a first movable member, first interconnecting means operative to interconnect said diaphragm adjusting means and said first movable member to produce equi-multiple changes in the area of said lens aperture with equal changes in the operative position of said first movable member, a second movable member, second interconnecting means for interconnecting said focusing means and said second movable member to produce corresponding movement of said lens and said movable member, said second interconnecting means so interconnecting said second movable member and said focusing means that when the object distance is that distance indicated by said indicating means equal changes in the operative position of said second movable member correspond, at constant aperture area, with equi-multiple changes in the image intensity on said sensitized surface and means for adjustably connecting said first and second movable members to maintain a predetermined but adjustable relationship between said lens aperture and the focal position of said lens.

4. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in an adjustable predetermined relationship with respect to the focal position of the lens and the sensitized surface of said photographic apparatus comprising, in combination, a diaphragm for varying said lens aperture, rotatable diaphragm adjusting means so connected to said diaphragm that angular movement of said adjusting means is substantially proportional to the square of the diameter of said aperture, focusing means mechanically connected to said lens for moving said lens to a focal position corresponding to the distance between the lens and the object to be photographed, indicating means associated with said focusing means for indicating the object distance for which said lens is focused, a first rotatable member, first interconnecting means operative to interconnect said diaphragm adjusting means and said first rotatable member to produce equi-multiple changes in the area of said lens aperture with equi-angular changes in the operative position of said first rotatable member, a second rotatable member, second interconnecting means for interconnecting said focusing means and said second rotatable member to produce corresponding movement of said lens and said second member, said second interconnecting means so interconnecting said second rotatable member and said focusing means that when the object distance is that distance indicated by said indicating means equi-angular changes in the operative position of said second rotatable member correspond, at constant aperture area, with equi-multiple changes in the image intensity on said sensitized surface and means for adjustable connecting said first and second rotatable members to maintain a predetermined but adjustable desired relationship between the lens aperture and the focal position of said lens.

5. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, focusing means mechanically connected to said lens for moving said lens to a focal position corresponding with the distance between the lens and the object to be photographed, indicating means associated with said focusing means for indicating the object distance for which said lens is focused, a first gear element mounted in fixed relation to said aperture ring, a second gear element adapted to mesh with said first gear element, said gear elements being so shaped that equal movements of said second gear element correspond with equi-multiple changes in said lens aperture and interconnecting means for interconnecting said second gear element and said focusing means to produce corresponding movement of said lens and said second gear element, said interconnecting means so interconnecting said second gear element and said focusing means that when the object distance is that distance indicated by said indicating means, equal movements of said second gear element correspond, at constant aperture area, with equi-multiple changes in the image intensity on said sensitized surface.

6. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, focusing means mechanically connected to said lens for moving said lens to a focal position corresponding with the distance between the lens and the object to be photographed, indicating means associated with said focusing means for indicating the object distance for which said lens is focused, a first gear element mounted in fixed relation with respect to said aperture ring, a shaft, a second gear element rotatably mounted on said shaft and adapted to mesh with said first gear element, and said first and second gear elements being so shaped as to produce equi-multiple changes in said lens aperture with equi-angular movements of said second gear element, and interconnecting means for interconnecting said focusing means and said second gear element, said interconnecting means so interconnecting said second gear element and said focusing means that when the object distance is that distance indicated by said indicating means equi-angular changes in the position of said second gear element correspond, at constant aperture area, with equi-multiple changes in the image intensity on said sensitized surface.

7. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, a focusing ring mechanically connected to said lens for moving said lens to a focal position corresponding with the distance between the lens and the object to be photographed, said focusing ring being so connected to said lens that angular movement of said ring is proportional to focusing movement of said lens, indicating means associated with said focusing ring for indicating the object distance for which said lens is focused, a first gear element mounted in fixed relation with respect to said aperture ring, a shaft, a second gear element mounted on said shaft and adapted to mesh with said first gear element, said first and second gear elements being so shaped that equi-multiple changes in said lens aperture correspond with equi-angular movements of said second gear element, a third gear element mounted on said shaft and connected to said second gear element and a fourth gear element mounted on said focusing ring and adapted to mesh with said third gear element, said third and fourth gear elements being so shaped that when the object distance is that distance indicated by said indicating means equi-angular movements of said third gear element correspond, at constant aperture, area, with equi-multiple changes in the image intensity on said sensitized surface.

8. In photographic apparatus of the type wherein a source of illumination for illuminating the object to be photographed is maintained in substantially fixed relation with respect to a lens and sensitized surface of said photographic apparatus and invariable relation with respect to said object to be photographed, mechanism for maintaining the lens aperture in an adjustable predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, a focusing ring mechanically connected to said lens for moving said lens to a focal position corresponding with the distance between the lens and the object to be photographed, said focusing ring being so connected to said lens that angular movement of said ring is proportional to focusing movement of said lens, indicating means associated with said focusing ring for indicating the object distance for which said lens is focused, a first gear element mounted in fixed relation with respect to said aperture ring, a shaft, a second gear element mounted on said shaft and adapted to mesh with said first gear element, said first and second gear elements being so shaped that equi-multiple changes in said lens aperture correspond with equi-angular movements of said second gear element, a third gear element mounted on said shaft and connected to said second gear element, a fourth gear element mounted on said focusing ring and adapted to mesh with said third gear element, said third and fourth gear elements being so shaped that when the object distance is that distance indicated by said indicating means equi-angular movements of said third gear element correspond, at constant aperture area, with equi-multiple changes in the image intensity on said sensitized surface, and means for adjustably connecting said second and third gear elements to maintain a desired relationship between said lens aperture and the focal position of said lens.

9. In photographic apparatus of the type wherein a source of illumination for illuminating the object to be photographed is maintained in substantially fixed relation with respect to a lens and sensitized surface of said photographic apparatus and in variable relation with respect to said object to be photographed, and wherein said lens is focused by movement of a lens mount with respect to a casing containing said sensitized surface, mechanism for maintaining the lens aperture in predetermined relationship with respect to the focal position of the lens and the sensitized surface of said apparatus comprising, in combination, a diaphragm for varying said lens aperture, an aperture ring so connected to said diaphragm that angular movement of said aperture ring is substantially proportional to the square of the diameter of said aperture, focusing means mechanically connected to said lens for moving said lens mount to move said lens to a focal position corresponding with the distance between said lens and the object to be photographed, indicating means associated with said focusing means for indicating the object distance for which said lens is focused, a gear segment mounted on said aperture ring, a spiral gear rotatably mounted on said lens mount and adapted to mesh with said gear segment, said spiral gear and gear segment being so shaped that equi-angular movements of said spiral gear correspond with equi-multiple changes in said lens aperture, a spiral drum rotatably mounted on said lens mount and having a spiral groove containing a flexible connecting member, one end of said flexible member being effectively connected to said drum and the other end of said flexible member being effectively connected to said casing, spring means for urging said drum in a direction to tend to wind said flexible connecting member on said drum whereby as said lens is adjusted with respect to said casing said drum is rotated by said flexible connecting member, said spiral groove being so shaped that when the object distance is that distance indicated by said indicating means, equi-angular movements of said drum correspond, at constant aperture area, with equi-multiple changes in the image intensity on said sensitized surface and means for so interconnecting said spiral gear and spiral drum that equi-angular changes in the operative position of said drum produce equi-angular changes in the operative position of said spiral gear.

10. In photographic apparatus of the type wherein a source of illumination for illuminating the object to be photographed is maintained in substantially fixed relation with respect to a lens and sensitized surface of said photographic apparatus and in variable relation with respect to said object to be photographed, and wherein said lens is focused by movement of a lens mount with respect to a casing containing said sensitized surface, mechanism for maintaining the lens aperture in predetermined relationship with respect to the focal position of the lens and the sensitized surface of said apparatus comprising, in combination, a diaphragm for varying said lens aperture, an aperture ring so connected to said diaphragm that angular movement of said aperture ring is substantially proportional to the square of the diameter of said aperture, focusing means mechanically connected to said lens for moving said lens mount to move said lens to a focal position corresponding with the distance between said lens and the object to be photographed, indicating means associated with said focusing means for indicating the object distance for which said lens is focused, a gear segment mounted on said aperture ring, a spiral gear rotatably mounted on said lens mount and adapted to mesh with said gear segment, said spiral gear and gear segment being so shaped that equi-angular movements of said spiral gear correspond with equi-multiple changes in said lens aperture, a spiral drum rotatably mounted on said lens mount and having a spiral groove containing a flexible connecting member, one end of said flexible member being effectively connected to said drum and the other end of said flexible member being effectively connected to said casing, spring means for urging said drum in a direction to tend to wind said flexible connecting member on said drum whereby as said lens is adjusted with respect to said casing said drum is rotated by said flexible connecting member, said spiral groove being so shaped that when the object distance is that distance indicated by said indicating means, equi-angular movements of said drum correspond, at constant aperture area, with equi-multiple changes in the image intensity on said sensitized surface and means for so interconnecting said spiral gear and spiral drum that equi-angular changes in the operative position of said drum produce equi-angular changes in the operative position of said spiral gear, said interconnecting means being adjustable to vary the predetermined relationship between said lens aperture and the focal position of said lens for different flash factors.

11. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, a focusing ring mechanically connected to said lens for moving said lens to a focal position corresponding with the distance between the lens and the object to be photographed, said focusing ring being so connected to said lens that angular movement of said focusing ring is proportional to focusing movement of said lens, indicating means associated with said focusing ring for indicating the object distance for which said lens is focused, a first rotatable member rotatable with said aperture ring, a second rotatable member rotatable with said focusing ring, a linearly movable member, first interconnecting means so interconnecting said first rotatable member and said linear member that said linear member moves an amount proportional to the tangent of the angle through which said first rotatable member rotates and second interconnecting means so interconnecting said second rotatable member and said linear member as to cause said linear member to move an amount proportional to the tangent of the angle through which said second rotatable member rotates, whereby said predetermined relationship between aperture and lens position is maintained as said lens is focused.

12. In photographic apparatus of the type wherein a source of illumination for illuminating the object to be photographed is maintained in substantially fixed relation with respect to a lens and sensitized surface of said photographic apparatus and in variable relation with respect to said object to be photographed, mechanism for maintaining the lens aperture in predetermined relationship with respect to the focal position of the lens and the sensitized surface of said photographic apparatus comprising, in combination, a diaphragm for varying said lens aperture, an aperture ring so connected to said diaphragm that angular movement of said aperture ring is substantially proportional to the square of the diameter of said aperture, a focusing ring mechanically connected to said lens for moving said lens to a focal position corresponding with the distance between the lens and the object to be photographed, said focusing ring being so connected to said lens that angular movement of said focusing ring is proportional to focusing movement of said lens, indicating means associated with said focusing ring for indicating the object distance for which said lens is focused, a first rotatable member rotatable with said aperture ring, a second rotatable member rotatable with said focusing ring, a linearly movable member, first interconnecting means so interconnecting said first rotatable member and said linear member that said linear member moves an amount proportional to the tangent of the angle through which said first rotatable member rotates, second interconnecting means so interconnecting said second rotatable member and said linear member as to cause said linear member to move an amount proportional to the tangent of the angle through which said second rotatable member rotates; whereby said predetermined relationship between aperture and lens position is maintained as said lens is focused, and adjusting means for adjusting the length of said linear member to adjust the relationship between said lens aperture and the focal position of said lens for different flash factors.

JOHN B. DAVENPORT.
GEOFFREY GILBERT.

REFERENCES CITED

The following references are of record in the file of this patent:

UNITED STATES PATENTS

| Number | Name | Date |
|---|---|---|
| 1,235,685 | Hansch | Aug. 7, 1917 |
| 1,546,060 | Carmine | July 14, 1925 |
| 1,627,722 | Balston | May 10, 1927 |
| 2,026,675 | Edwards | Jan. 7, 1936 |
| 2,213,749 | Strauss | Sept. 3, 1940 |
| 2,239,379 | Bucky | Oct. 19, 1941 |
| 2,278,173 | Goering | Mar. 31, 1942 |
| 2,334,075 | Davenport | Nov. 9, 1943 |
| 2,351,834 | Phillips | June 20, 1944 |
| 2,369,199 | Aiken | Feb. 13, 1945 |

FOREIGN PATENTS

| Number | Country | Date |
|---|---|---|
| 187,077 | Great Britain | Oct. 19, 1922 |